Patented Nov. 21, 1933

1,935,928

UNITED STATES PATENT OFFICE 1,935,928

ALPHA - HYDROXYANTHRONE DERIVATIVES AND PROCESS OF PREPARING THEM

Karl Zahn, Frankfort-on-the-Main-Hochst, and Hans Schlichenmaier, Bad Soden, Germany, assignors to General Aniline Works, Inc., New York, N. Y., a corporation of Delaware No Drawing. Application September 24, 1929, Serial No. 394,919, and in Germany October 17, 1928

16 Claims. (Cl. 260—58)

The present invention relates to α-hydroxy anthrone derivatives and to a process of preparing them.

There exist numerous publications dealing with the reduction of α-hydroxyanthraquinones. According to U. S. Patent No. 1,025,174 there are obtained on reducing 1-hydroxyanthraquinone, a hydroxyanthranol and a hydroxyanthrone, respectively, melting at 133° C.–135° C. (cf. also Berichte der Deutschen Chemischen Gesellschaft volume 38, page 1794 and Annalen der Chemie volume 420, page 114). When reducing 1.8-dihydroxyanthraquinone (chrysazin), there is obtained, according to German Specification No. 296,091, 1.8-dihydroxyanthranol melting at 178° C.–180° C. (cf. also Berichte der Deutschen Chemischen Gesellschaft volume 35, page 2930). From quinizarin there is obtained the already-known leukoquinizarin melting at 153° C.–154° C. (cf. Journal fuer praktische Chemie 2, 76, page 138).

Now we have found that other reduction products are obtainable by reducing, instead of the free hydroxyanthraquinones, their O-acylderivatives of the following general formula:

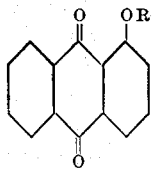

wherein R stands for an acyl group and the two benzene nuclei may contain substituents.

It is advantageous to use a neutral to weakly acid solution or suspension at a moderately elevated temperature, preferably between about 50° C. and 100° C. The reduction is carried out either with substances having a reducing action such as, for instance, sodium hydrosulfite, zinc dust or the like, or with hydrogen in the presence of a catalyst, such as nickel or the like. As solvents may be used: diluted acetic acid, alcohol, dekahydro-naphthalene, water or the like. There are thus obtained: from 1-acetoxyanthraquinone a hydroxyanthrone melting at 238° C.–240° C., from chrysazin diacetate an acetoxy-hydroxyanthrone melting at 247° C.–248° C. and from quinizarin diacetate an isomeride melting at 208° C. Analogous compounds are obtained from alizarin- and anthrarufin diacetate, as well as from any substitution products of the said compounds.

The course which the reaction takes is novel and surprising, since one of the acyl groups present at a time is split off by the reduction. The compounds thus obtained are all new and of great value for the manufacture of dyestuffs and pharmaceutical products. They have the following general formula:

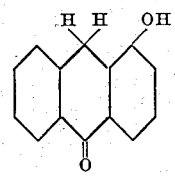

wherein the two benzene nuclei may contain substituents.

The following examples illustrate the invention, but are not intended to limit it thereto; the parts being by weight:

(1) A solution of 27 parts of 1-acetoxy anthraquinone in 10 times its weight of hot glacial acetic acid is run into the equal quantity of cold water while stirring. The suspension thus obtained is heated to 65° C. and 30 parts of sodium hydrosulfite are added by portions. The first half of the hydrosulfite can be introduced rather quickly, so that temporarily a clear brownish-yellow solution is obtained. By further adding hydrosulfite a feebly yellowish crystalline precipitate separates gradually which, after having cooled down, is filtered by suction and washed with hot water. The yield amounts to 80–90% of the theory. Instead of using glacial acetic acid, the 1-acetoxy anthraquinone may also be dissolved in the corresponding quantity of alcohol. The same result may be obtained by substituting for the acetoxy anthraquinone the corresponding benzoyl derivative. The α-hydroxy anthrone thus obtained is recrystallized from chlorobenzene, in which it is very difficultly soluble, and forms fine, nearly colorless needles melting at 238° C.–240° C. while assuming a red coloration. It has probably the following constitution:

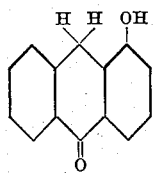

In dilute alkali it dissolves to a yellow solution; in concentrated sulfuric acid it dissolves to a yellow solution which on adding nitric acid assumes a reddish violet coloration.

(2) 27 parts of 1-acetoxyanthraquinone are suspended in an iron pressure vessel in 300 parts of dekahydro-naphthalene and 2 parts of a nickel catalyst are added. The autoclave is then filled with hydrogen to a pressure of 40 atmospheres and heated gradually to 85° C.–90° C. while stirring. Within a short time about 4500 parts by volume of hydrogen are used up; the reduction is interrupted, the solution is allowed to cool down and the reaction product is filtered by suction. On recrystallization from glacial acetic acid it melts at 238° C.–240° C. and is in all its properties identical with the α-hydroxyanthrone obtained according to Example 1.

(3) 20 parts of 1.8-diacetoxyanthraquinone (chrysazin diacetate) of the following formula:

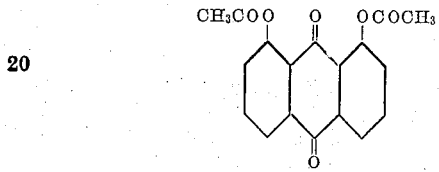

are dissolved in 300 parts of glacial acetic acid and finely subdivided by introducing 300 parts of water. The reduction is effected by means of 25 parts of sodium hydrosulfite according to the manner indicated in Example 1 and a reduction product is thus obtained which, as the analysis shows, represents an acetoxyhydroxyanthrone. It is nearly colorless and melts, when being recrystallized from glacial acetic acid or chlorobenzene, at 247° C.–248° C. and has the following probable constitution:

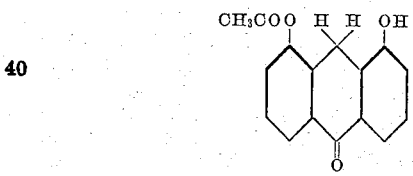

It dissolves in dilute alkali to a yellow solution and in concentrated sulfuric acid to a brownish-yellow solution which on being heated assumes a blue coloration.

(4) 60 parts of 1.4-diacetoxyanthraquinone (quinizarin diacetate) are dissolved in 400 parts of glacial acetic acid, precipitated with 400 parts of water and reduced in the above described manner with 80 parts of sodium hydrosulfite. The reaction product thus obtained forms, when recrystallized from glacial acetic acid nearly colorless needles; it melts at about 208° C. and dissolves in alkali to a yellow solution. The solution is auto-oxidizable in the heat. The new product dissolves in concentrated sulfuric acid to a yellow solution which on addition of a trace of nitric acid assumes a violet coloration. The compound represents an acetoxyhydroxyanthrone of the probable following constitution:

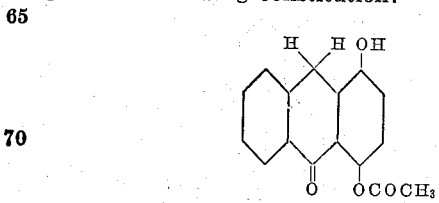

By saponification with alkali or acid the acetyl group may be split off and there is obtained a dihydroxyanthrone of the following probable constitution:

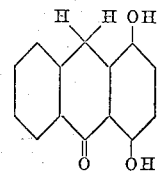

melting at about 220° C.

(5) 30 parts of quinizarin diacetate suspended in dekahydronaphthalene are catalytically reduced in the presence of nickel as described in Example 2. The product thus obtained is identical with that obtained according to Example 4.

(6) 20 parts of 5.8-dichloro-quinizarin-diacetate of the following formula:

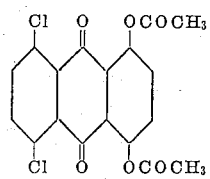

are finely subdivided and reduced in an aqueous suspension with 25 parts of sodium hydrosulfite at 60° C.–70° C. The parent material is transformed without being dissolved into a nearly colorless reduction product which melts, when recrystallized from glacial acetic acid at about 220° C. It has the following probable constitution:

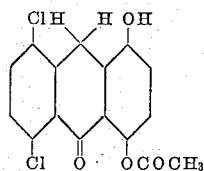

Any other α-acyloxyanthraquinone may be reduced in a similar manner. From alizarin diacetate, for instance, there is obtained an acetoxyhydroxyanthrone melting at 188° C.–189° C., from anthrarufin diacetate an isomeride melting at 207° C. and from 3-methyl-quinizarin diacetate an acetoxy-hydroxy-methyl-anthrone in the form of light yellow needles melting at 218° C.–219° C.

We claim:

1. The process which comprises reducing an anthraquinone compound which contains in an α-position an -O-acyl radical of the group consisting of -O-acetyl and -O-benzoyl in the presence of a diluent having a neutral to weakly acid reaction at a temperature of between about 50° C. and about 100° C.

2. The process which comprises reducing an anthraquinone compound which contains in an α-position an -O-acyl radical of the group consisting of -O-acetyl and -O-benzoyl by means of an alkali-metal hydrosulfite in the presence of a diluent having a neutral to weakly acid reaction at a temperature of between about 50° and about 100° C.

3. The process of preparing α-hydroxy anthrone derivatives which comprises reducing a compound of the following formula:

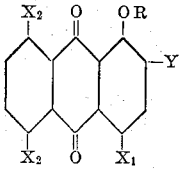

wherein R stands for acetyl or benzoyl, Y and X₁ for hydrogen, alkyl or the group OR and X₂ for hydrogen, halogen or the group OR in the presence of a diluent having a neutral to weakly acid reaction at a temperature of between about 50° C. and about 100° C.

4. The process of preparing α-hydroxy-anthrone derivatives which comprises reducing a compound of the following formula:

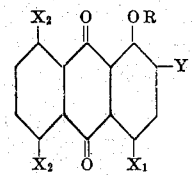

wherein R stands for acetyl or benzoyl, Y and X₁ for hydrogen, alkyl or the group —OR and X₂ for hydrogen, halogen or the group —OR by means of sodium hydrosulfite in the presence of dilute acetic acid at a temperature of between about 50° C. and about 100° C.

5. The process of preparing α-hydroxy anthrone derivatives which comprises reducing a compound of the following formula:

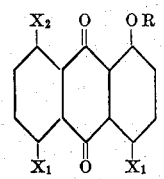

wherein R stands for acetyl or benzoyl, X₁ for hydrogen or the group OR and X₂ for hydrogen, halogen or the group OR in the presence of a diluent having a neutral to weakly acid reaction at a temperature of between about 50° C. and about 100° C.

6. The process of preparing α-hydroxy-anthrone derivatives which comprises reducing a compound of the following formula:

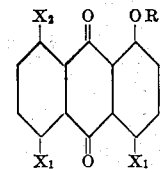

wherein R stands for acetyl or benzoyl, X₁ for hydrogen or the group OR and X₂ for hydrogen, halogen or the group OR by means of sodium hydrosulfite in the presence of dilute acetic acid at a temperature of between about 50° C. and about 100° C.

7. The process of preparing α-hydroxy-anthrone derivatives which comprises reducing a compound of the following formula:

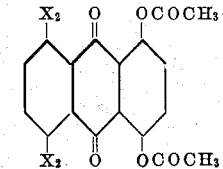

wherein X₂ stands for hydrogen or chlorine in the presence of a diluent having a neutral to weakly acid reaction at a temperature of between about 50° C. and about 100° C.

8. The process of preparing α-hydroxy-anthrone derivatives which comprises reducing a compound of the following formula:

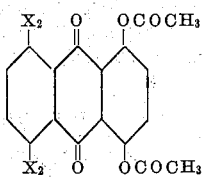

wherein X₂ stands for hydrogen or chlorine by means of sodium hydrosulfite in the presence of dilute acetic acid at a temperature of between about 50° C. and about 100° C.

9. The process of preparing alpha-hydroxyanthrone derivatives which comprises reducing 1.4-diacetoxy-5.8-dichloroanthraquinone in the presence of a diluent having a neutral to weakly acid reaction at a temperature of between about 50° C. and 100° C.

10. The process of preparing alpha-hydroxyanthrone derivatives which comprises reducing 1.4 - diacetoxy - 5.8 - dichloroanthraquinone by means of sodium hydrosulfite in the presence of dilute acetic acid at a temperature of between 60° C. and 70° C.

11. As new products, the compounds of the following probable formula:

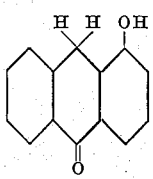

wherein the two benzene nuclei may contain substituents being weakly colored products which are soluble in diluted alkali-lyes.

12. As new products, compounds of the following probable formula:

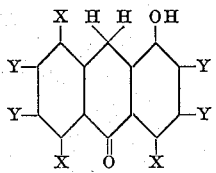

wherein X stands for hydrogen, halogen the hydroxy group or the group ORY for hydrogen, alkyl or the group OR and R for an acetyl or benzoyl group, being weakly colored products which are soluble in diluted alkali-lyes.

13. As new products, compounds of the following probable formula:

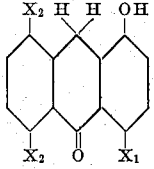

wherein X₁ stands for hydrogen, a hydroxy group or the group OCOCH₃ and X₂ stands for hydrogen or chlorine, being weakly colored products which are soluble in diluted alkali-lyes.

14. As a new product, 1-hydroxy-4-acetoxy-5.8-dichloroanthrone of the following formula:

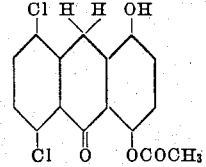

being a nearly colorless product which melts at about 222° C., when recrystallized from glacial acetic acid, and dissolves in diluted aqueous alkalilyes to a brownish-yellow solution.

15. As a new product, the compound of the following formula:

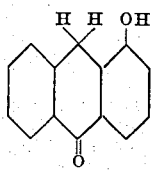

forming after crystallization from chlorobenzene fine, nearly colorless needles, melting at 238° C.–240° C. while assuming a red coloration, dissolving in dilute alkali and in concentrated sulfuric acid to a yellow solution.

16. As a new product, the compound of the following formula:

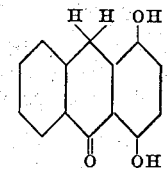

melting at about 220° C.

KARL ZAHN.
HANS SCHLICHENMAIER.